318-135

Feb. 10, 1970 J. D. FLORA 3,495,147
MAGNETIC POSITIONING DEVICE FOR COMPUTER DISC FILES AND OTHER USES
Filed Dec. 28, 1967

INVENTOR:
JAMES D. FLORA,

BY Norman C. Fulmer
HIS ATTORNEY.

United States Patent Office 3,495,147
Patented Feb. 10, 1970

3,495,147

MAGNETIC POSITIONING DEVICE FOR COMPUTER DISC FILES AND OTHER USES

James D. Flora, East Syracuse, N.Y., assignor to General Electric Company, a corporation of New York Filed Dec. 28, 1967, Ser. No. 694,281
Int. Cl. H02k *33/12;* H01f *7/16*
U.S. Cl. 318—135 5 Claims

ABSTRACT OF THE DISCLOSURE

A magnetic positioning device is disclosed, having two electrical windings arranged concentrically around a slidable magnetic armature. The magnetic armature is composed of two elongated permanent magnets in tandem with like poles together at a mutual boundary. The two windings are tapered, one into the other, whereby currents applied therein produce a sharp magnetic-field null at which the mutual boundary of the armature automatically positions itself. By varying the relative current in the windings, the armature is caused to move to a desired position, thereby accurately positioning, for example, a magnetic head at a desired data track on a computer magnetic disc file.

Background of the invention

Several arrangements for magnetic positioners have been devised, for positioning a movable magnetic armature by means of magnetic fields produced by one or more electrical windings. An example of a critical application for such devices is for positioning a recording and/or reproducing magnetic head with respect to data tracks on a computer magnetic disc file, in which computer data is recorded on concentric circular tracks of a magnetizable rotating disc. The number of concentric circular data tracks that can be employed on the disc is limited by the accuracy with which the magnetic head can be positioned to the various tracks. There has long been a need for improved accuracy in positioning the magnetic heads so that more tracks, and hence more computer data, can be stored on the magnetic discs. Some arrangements have employed a linear-motion arrangement for positioning the magnetic head, others have employed a pivoted swinging-arm mechanism, and others have resorted to the use of a plurality of magnetic heads respectively positioned with respect to each of the data tracks.

Summary of the invention

Objects of the invention are to provide an improved magnetic positioning device, and to provide such a device for positioning more accurately so that, for example, a greater amount of computer data can be stored on magnetic disc files. The invention comprises, briefly and in a preferred embodiment, a pair of electrical windings arranged concentrically around a slidable magnetic armature which is composed of a pair of elongated permanent magnets in tandem with like poles together at a mutual boundary. The windings are tapered, one into the other, whereby currents applied therein produce a sharp magnetic field null at which the mutual boundary of the armature automatically positions itself. Means are provided to vary the relative currents in the windings, so that the core is caused to move to a desired position, thereby accurately positioning, for example, a magnetic head at a desired data track on a computer magnetic disc file.

Figure 1:
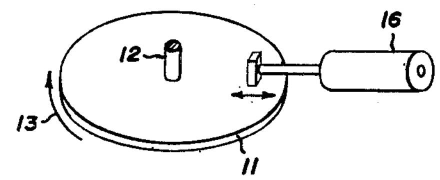
FIGURE 1 is a prespective view of a preferred embodiment of the invention.
Figure 2:
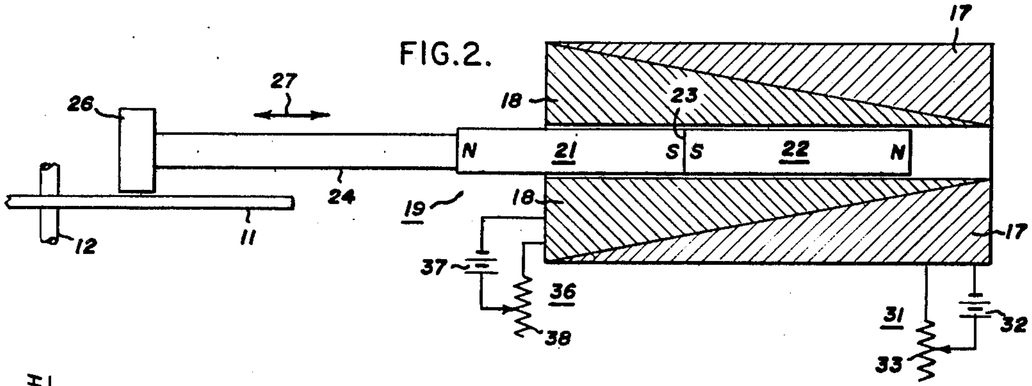
FIGURE 2 is a partial cross-sectional side view of the embodiment of FIGURE 1.

Now referring to FIGURES 1 and 2, a magnetizable disc 11 is carried by a rotatable shaft 12 for rotating the disc in a direction, for example, as indicated by the arrow 13. Usually the disc 11 is plastic or nonmagnetic metal, coated on the surface thereof with a layer of magnetizable iron-oxide particles. A magnetic positioning device 16, suitably positioned with respect to the disc 11, comprises two electrical windings 17 and 18 arranged concentrically around a slidable magnetic armature 19 composed of a pair of elongated permanent magnets 21, 22 in tandem with like poles together at a mutual boundary 23. An extension rod 24 is carried by the armature 19, and in turn carries a magnetic recording and/or reproducing head 26, as shown. The assembly of the armature 19, extension 24, and head 26 may be slidably carried by suitable means, such as by vanes extending laterally therefrom and into guide slots of fixedly positioned guide bars, so that when the armature 19 is caused to slide in a manner to be described, as indicated by the double arrow 27, the magnetic head 26 is caused to move axially over, and adjacent to, the magnetizable surface of the disc 11. Care should be taken that the magnet 21 does not approach close enough to the disc 11 to magnetically erase data therefrom.

The two windings 17 and 18 are tapered, one into the other, as shown. A variable current means 31, shown as comprising a battery 32 connected in series with a rheostat 33, is connected to apply current in one of the windings 17, and another variable current source 36, shown as comprising a battery 37 in series with a rheostat 38, is connected to apply current in the other winding 18. In actual practice, the variable current sources 31 and 36 normally will comprise electronic circuits for providing variable current values, or variable step-functions of current.

Figure 4:
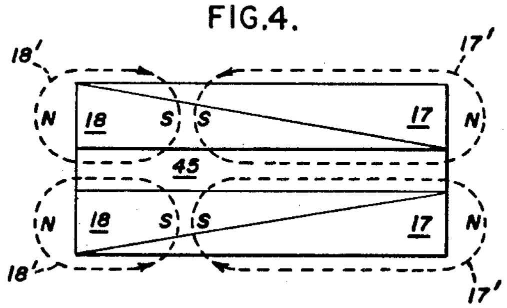
FIGURE 4 is a sectional view of magnetic windings showing magnetii fields established thereby.

The currents are applied in the windings 17 and 18 so as to provide magnetic fields in these windings polarized in opposite directions. In the example shown, the mutual boundary 23 of the armature 19 comprises south magnetic poles, and therefore the currents provided in the windings 17 and 18 are such as to produce similarly oriented magnetic fields, as shown in FIGURE 4. That is, the winding 17 produces an electromagnetic field 17′ having a north pole at the thicker end of the winding and a south pole at the thinner end of the winding, and the winding 18 produces a magnetic field 18′ having a south pole toward the thinner end of the winding, a north pole at the thicker end of winding. The combined effects of the magnetic fields 17′ and 18′ produce a magnetic south-pole null at a point 45 along the axis of the coil assembly dependent upon the relative strengths of the magnetic fields 17′ and 18′, which in turn are dependent upon the number of turns in each winding multiplied by the currents therein. Preferably the two windings 17 and 18 comprise equal numbers of turns, whereupon equal amounts of currents therein will produce a magnetic null at the center of the coil assembly 16.

Figure 3:
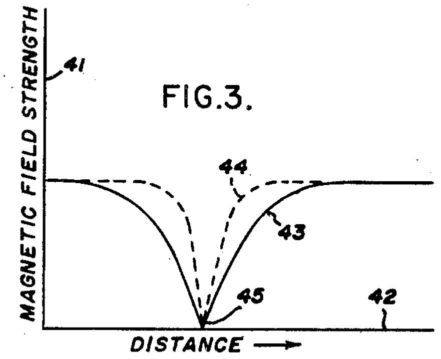
FIGURE 3 is a graphical representation of magnetic fields for explaining operation of the invention.

FIGURE 3 illustrates the magnetic null produced by the combined magnetic fields shown in FIGURE 4. In FIGURE 3, the vertical axis 41 represents magnetic field strength, and the horizontal axis 42 represents distance along the assembly of coils 17 and 18. The solid-line curve 43 illustrates the net magnetic field produced by the coils 17 and 18, the peak of the null occurring at the junction of the two magnetic fields 17' and 18' produced by the windings. A relatively greater amount of current in the two windings will produce a curve having a sharper null, as indicated by the dotted curve 44. The armature 19 is positioned so that the mutual magnetic boundary 23 is at the null point 45, and it automatically follows this null when the null is moved to the left or to the right by varying the relative currents in the windings 17 and 18.

By thus causing the armature 19 to slide, the magnetic head 26 can be accurately positioned at a desired data track on the data disc 11. To accomplish this positioning of the magnetic head, the variable current sources 31 and 36 can cause the current in the coils to vary in opposite directions, or, if desired, a fixed current may be maintained in one winding, and a variable current applied in the other winding.

From the foregoing, it will be obvious as to how the armature magnetic junction 23 automatically positions itself by sliding along the axis of the winding 17 so as to remain at the magnetic field null point 45, since any slight deviation from this null would place the mutual boundary 23 in a like magnetic field, which will repel it back to the null position.

Figure 5:
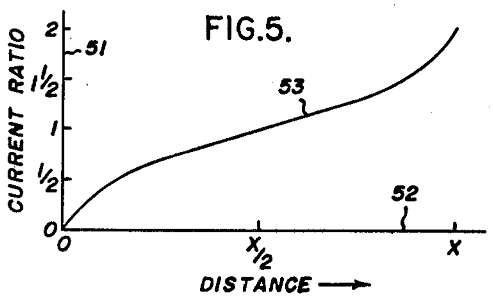
FIGURE 5 is a plot of current ratio versus distance along the coil arrangement, illustrating the degree of linearity of operation of the invention.

By providing tapered windings 17 and 18, in accordance with the invention, a greater distance of controllable motion of the armature 19 is achieved, and also more accuracy is achieved, because the null 45 has uniformly sharp characteristics over a wide range of operation, whereas with untapered coils in tandem the null would tend to rapidly become weaker when shifted toward the ends of the winding assembly. In FIGURE 5, the vertical axis 51 represents the ratio of currents in the two windings and the horizontal axis 52 represents distance along the assembly of the coils 17, 18. The curve 53 represents the current ratio versus distance of the magnetic null along the length of the winding assembly. As is evident, the curve 53 indicates a very good linearity of null functioning, and hence positioning action of the device, over approximately 80% or 90% of the total length X of the winding assembly.

The invention, by means of inter-tapered windings and associated structure, achieves a greater distance of magnetic positioning, with greater accuracy than heretofore, thereby permitting the use of a greater number of concentric data tracks on a data disc 11 of greater total diameter than heretofore, thus considerably increasing the amount of computer data that can be stored on a magnetic disc 11. When this increased data storage capacity is multiplied by the total number of data discs 11 employed in a disc memory system, the improvement achieved by the invention is even more beneficial.

The windings 17 and 18 may be shaped so as to have substantially straight diagonal boundaries as shown in the preferred embodiment, or may be wound in a stepped manner so as to have a plurality of successive mutually mated steps at the mutual boundaries thereof.

While a preferred embodiment of the invention has been shown and described, other embodiments and modifications thereof will be apparent to persons skilled in the art, and will fall within the scope of invention as defined in the following claims.

I claim:

1. A magnetic positioning device having a winding assembly arranged around a slidable armature composed of a pair of elongated permanent magnets in tandem with like poles together at a mutual boundary, wherein the improvement comprises providing said winding assembly with a pair of coextensive windings, at least one of said windings having a relatively greater winding density toward one end of said winding assembly.

2. A device as claimed in claim 1, in which a first one of said pair of windings has a relatively greater winding density toward one end of said winding assembly, and in which the second one of said pair of windings has a relatively greater winding density toward the other end of said winding assembly.

3. A device as claimed in claim 2, in which said first and second windings are tapered, one into the other.

4. A device as claimed in claim 3, including current means connected to apply currents in said first and second windings in directions for establishing a magnetic field pattern having a magnetic null flanked by magnetic polarity the same as that of said like poles of the armature magnets, and means to vary said current in at least one of said windings.

5. A device as claimed in claim 4, including means to vary the currents in both of said first and second windings in relatively opposite directions.

References Cited

UNITED STATES PATENTS 3,193,800 7/1965 Shoulter ---------- 340—174.1

RICHARD A. FARLEY, Primary Examiner

DANIEL C. KAUFMAN, Assistant Examiner

U.S. Cl. X.R.

310—14, 30; 335—256, 282; 340—174.1